US008969775B2

(12) United States Patent
Chen et al.

(10) Patent No.: US 8,969,775 B2
(45) Date of Patent: Mar. 3, 2015

(54) HIGH DYNAMIC RANGE PIXEL HAVING A PLURALITY OF AMPLIFIER TRANSISTORS

(71) Applicant: Omnivision Technologies, Inc., Santa Clara, CA (US)

(72) Inventors: Gang Chen, San Jose, CA (US);
Zhiqiang Lin, Santa Clara, CA (US);
Sing-Chung Hu, San Jose, CA (US);
Duli Mao, Sunnyvale, CA (US);
Hsin-Chih Tai, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 193 days.

(21) Appl. No.: 13/781,388

(22) Filed: Feb. 28, 2013

(65) Prior Publication Data

US 2014/0239154 A1     Aug. 28, 2014

(51) Int. Cl.
*H01L 27/00*     (2006.01)
*H04N 5/335*     (2011.01)

(52) U.S. Cl.
CPC ................................ *H04N 5/335* (2013.01)
USPC ....................... 250/208.1; 348/308

(58) Field of Classification Search
CPC ...................................................... H04N 5/335
USPC ........................ 250/208.1; 348/308
See application file for complete search history.

(56) References Cited

U.S. PATENT DOCUMENTS

| | | | |
|---|---|---|---|
| 7,525,077 B2 | 4/2009 | Kim et al. | |
| 2010/0123771 A1 | 5/2010 | Moon et al. | |
| 2011/0226935 A1* | 9/2011 | Kawahito et al. | ........... 250/208.1 |
| 2013/0256509 A1 | 10/2013 | Yang et al. | |

OTHER PUBLICATIONS

U.S. Appl. No. 13/431,600—Non-Final Office Action, mailed Dec. 17, 2013, 10 pages.
U.S. Appl. No. 13/431,600—Final Office Action, mailed Jul. 29, 2014, 10 pages.
Yang, C. et al., U.S. Appl. No. 13/431,600, filed Mar. 27, 2012.
Lahav, A. et al., "Optimization of Random Telegraph Noise Non Uniformity in a CMOS Pixel with a pinned-photodiode," 2007 International Image Sensor Workshop, Jun. 6-10, Ogunquit, ME, pp. 230-233, retrieved from: www.imagesensors.org.

* cited by examiner

*Primary Examiner* — Thanh Luu
(74) *Attorney, Agent, or Firm* — Blakely Sokoloff Taylor & Zafman LLP

(57) ABSTRACT

A pixel cell for use in a high dynamic range image sensor includes a photodiode disposed in semiconductor material to accumulate charge in response to light incident upon the photodiode. A transfer transistor is disposed in the semiconductor material and is coupled between a floating diffusion and the photodiode. A first amplifier transistor is disposed in the semiconductor material having a gate terminal coupled to the floating diffusion and a source terminal coupled to generate a first output signal of the pixel cell. A second amplifier transistor is disposed in the semiconductor material having a gate terminal coupled to the floating diffusion and a source terminal coupled to generate a second output signal of the pixel cell.

22 Claims, 6 Drawing Sheets

HIGH DYNAMIC RANGE PIXEL HAVING A PLURALITY OF AMPLIFIER TRANSISTORS

BACKGROUND INFORMATION

1. Field of the Disclosure

The present invention is generally related to image sensors, and more specifically, the present invention is directed to high dynamic range image sensors.

2. Background

An image capture device includes an image sensor and an imaging lens. The imaging lens focuses light onto the image sensor to form an image, and the image sensor converts the light into electric signals. The electric signals are output from the image capture device to other components of a host electronic system. The electronic system may be, for example, a mobile phone, a computer, a digital camera or a medical device.

The demands on the image sensor to perform over a large range of lighting conditions, varying from low light conditions to bright light conditions are becoming more difficult to achieve as pixel cells become smaller. This performance capability is generally referred to as having high dynamic range imaging (HDRI or alternatively just HDR). In conventional image capture devices, pixel cells require multiple successive exposures to achieve HDR.

FIG. 1 is a circuit diagram showing a four-transistor ("4T") pixel cell 100. As shown, pixel cell 100 includes photosensitive element 110, transfer transistor 120, reset transistor 130, floating diffusion ("FD") 180, source follower ("SF") transistor 140, row select transistor 150, dual conversion gain transistor 160 and capacitor 165.

During operation of pixel cell 100, transfer transistor 120 receives a transfer signal TX, which transfers charge accumulated in photosensitive element 110 to floating diffusion FD 180. Reset transistor 130 is coupled between power supply VDD and floating diffusion FD 180 to reset the pixel cell (e.g., to discharge or charge floating diffusion FD 180 and/or photosensitive element 110 to a preset voltage) under control of reset signal RST. FD 180 is also coupled to control the gate of SF transistor 140. SF transistor 140 is coupled between power supply VDD and row select transistor 150. SF transistor 140 operates as a source follower providing a high impedance connection to floating diffusion FD 180. Under control of a select signal SEL, row select transistor 150 selectively provides an output of the pixel cell to a readout column line, or bit line 170.

Capacitor 165 and dual conversion gain transistor 160 are coupled in series between power supply VDD and floating diffusion FD 180, with dual conversion gain transistor 160 coupled to FD 180 and capacitor 165 coupled to power supply VDD. The capacitance of capacitor 165 may be added to FD 180 by asserting dual conversion gain signal, DCG, thereby decreasing the conversion gain of the pixel cell 100.

Photosensitive element 110 and FD 180 are reset by temporarily asserting the reset signal RST and the transfer signal TX. An image accumulation window (e.g., an exposure period) is commenced by de-asserting the transfer signal TX and permitting incident light to photogenerate electrons in photosensitive element 110. As photogenerated electrons accumulate in photosensitive element 110, the voltage on photosensitive element 110 decreases. The voltage or charge on photosensitive element 110 is indicative of the intensity of the light incident on photosensitive element 110 during the exposure period. At the end of the exposure period, the reset signal RST is de-asserted to isolate FD 180 and the transfer signal TX is asserted to allow an exchange of charge between photosensitive element 110 and FD 180, and hence the gate of SF transistor 140. The charge transfer causes the voltage of FD 180 to change by an amount that is proportional to photogenerated electrons accumulated on photosensitive element 110 during the exposure period. This second voltage biases SF transistor 140, which in combination with the select signal SEL being asserted, drives a signal from row select transistor 150 to the bit line 170. Data is then readout from the pixel cell 100 through bit line 170 as an analog signal.

By changing the conversion gain of the pixel cell 100 between successive image captures, the HDR of the resultant image can be increased. However, this would increase amount of time required to capture and readout one HDR image and affect the performance of the image capture device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
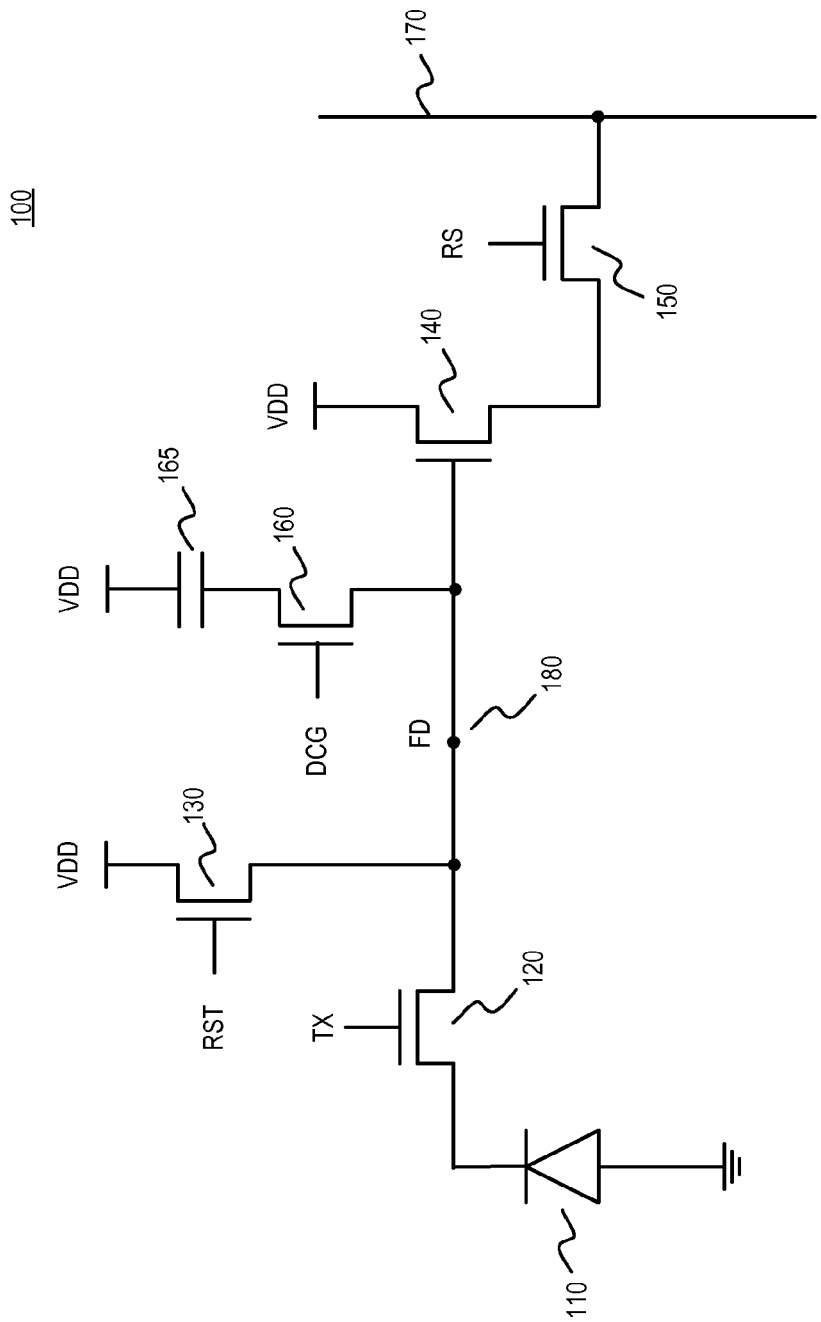
FIG. 1 is a circuit diagram showing a conventional four-transistor ("4T") pixel cell.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe an image sensor pixel cell for use in a high dynamic range (HDR) image sensor, including a plurality of amplifier transistors. In various examples, the amplifier transistors are coupled as source followers having different threshold voltages and gain characteristics. In the examples, the amplifier transistors are configured as dual source followers and the output signal from each amplifier transistors of the pixel cell is a component of an output amplification signal of the pixel cell. Operation of the dual source follower transistors may be based on the floating diffusion node transitioning to a voltage level corresponding to an amount of charge accumulated in a photodiode of the pixel cell. Each source follower transistor is coupled to their respective readout column line and readout circuit. In one example, an image sensor system with a pixel array comprising a plurality of pixel cells with this architecture includes two readout column lines per column of pixel cells.

In one example, under higher light intensity conditions, the voltage level at the floating diffusion node is low, since under these conditions, more photogenerated electrons resulting from the incident light are transferred to the floating diffusion node than under lower light intensity conditions. In such conditions, the source follower transistor with a lower threshold voltage will be active. Under lower light intensity conditions, the voltage level at the floating diffusion node will be high, since under these conditions fewer photogenerated electrons resulting from the incident light are transferred to the floating diffusion node than under higher light intensity conditions. In such conditions, both the source follower transistor with high threshold voltage and the source follower transistor with low threshold voltage will be active.

Figure 2:
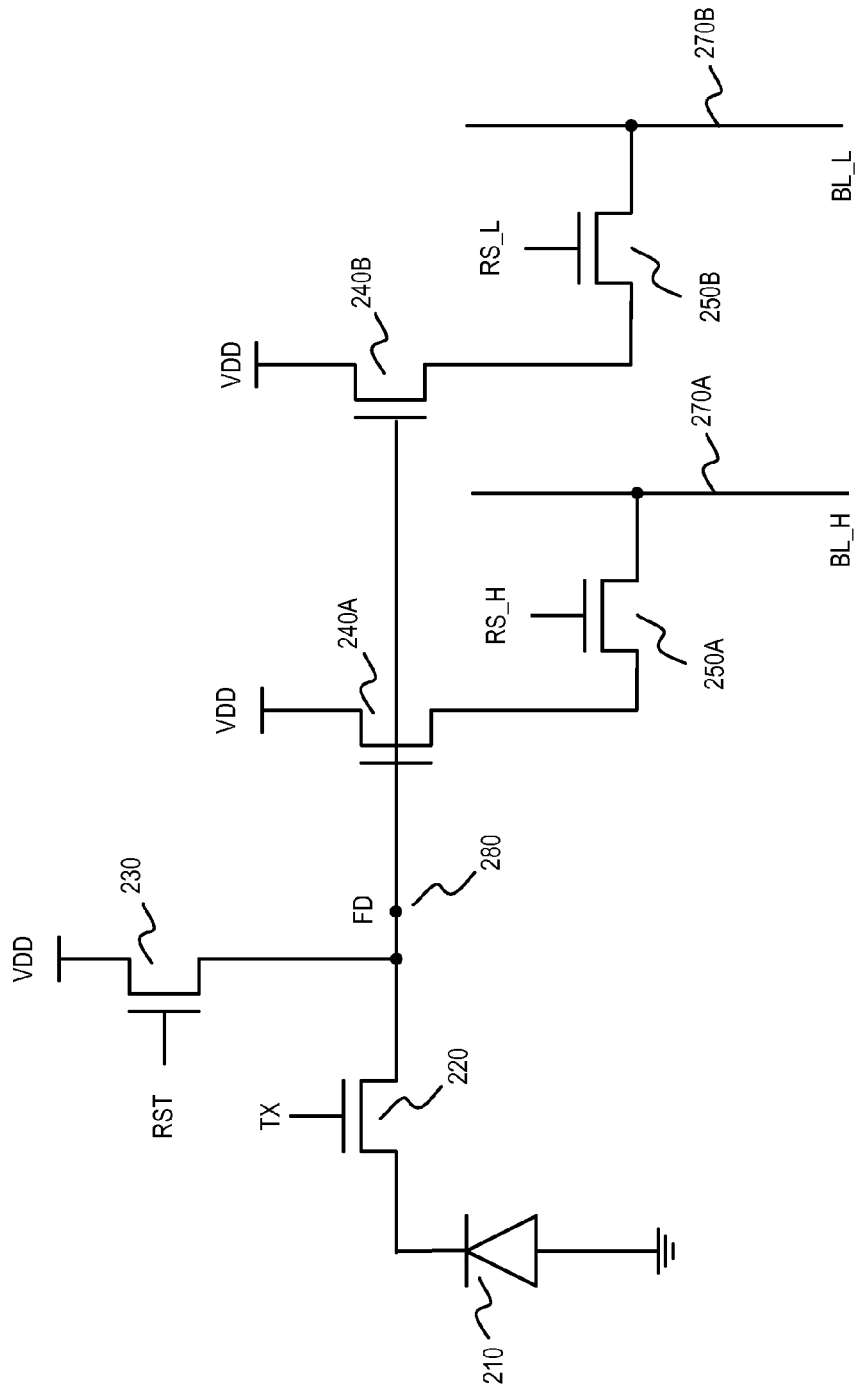
FIG. 2 is a circuit diagram showing the circuitry of a pixel cell having a plurality of amplifier transistors in accordance with the teachings of the present invention.

To illustrate, FIG. 2 is a circuit diagram showing one example of circuitry of a pixel cell 200 having a plurality of amplifier transistors 240A and 240B in accordance with the teachings of the present invention. As shown in the depicted example, amplifier transistors 240A and 240B are configured as source followers. In the example shown FIG. 2, pixel cell 200 is arranged to provide two output signals from transistors 240A and 240B to two readout column signal lines 270A and 270B. In the example, pixel cell 200 includes a photosensitive element, shown as photodiode 210, a transfer transistor 220, a reset transistor 230, a floating diffusion FD 280, a first amplifier transistor 240A, a second amplifier transistor 240B, a first row select transistor 250A and a second row select transistor 250B disposed in semiconductor material. In other examples, it is appreciated that pixel cell 200 may include a variety of alternative pixel cell architectures that include two amplifier transistors, which are coupled to floating diffusion FD 280 in a configuration similar to that of first amplifier transistor 240A and second amplifier transistor 240B in accordance with the teachings of the present invention.

During operation of pixel cell 200, charge accumulates in photodiode 210 in response to light incident upon photodiode 210. In one example, the type of charge that is accumulated in photodiode 210 in response to the incident light includes electrons. Transfer transistor 220 may receive a transfer signal TX, which transfers charge accumulated in photodiode 210 to floating diffusion FD 280. Reset transistor 230 may be coupled between a power supply VDD and floating diffusion FD 280 to reset the pixel cell 200 (e.g., to discharge or charge floating diffusion FD 280 and/or photodiode 210 to a preset voltage) under control of a reset signal RST.

As shown in the depicted example, floating diffusion FD 280 is coupled to control the gate of first amplifier transistor 240A. First amplifier transistor 240A may be coupled between power supply VDD and first row select transistor 250A. First amplifier transistor 240A may operate as a source follower providing a high impedance connection to floating diffusion FD 280 and amplify the voltage at floating diffusion FD 280 with a first gain. Second amplifier transistor 240B may be coupled between power supply VDD and second row select transistor 250B. Second amplifier transistor 240B may operate as a source follower providing a high impedance connection to floating diffusion FD 280 and amplify the voltage at floating diffusion FD 280 with a second gain. In one example, the first gain of first amplifier transistor 240A is different than the second gain of second amplifier transistor 240B in accordance with the teachings of the present invention.

In one example, first amplifier transistor 240A and second amplifier transistor 240B each provide a respective output signal from their respective source terminals. In one example, the output signals generated by first amplifier transistor 240A and second amplifier transistor 240B may be component signals of an amplification signal representative of the intensity of the light incident upon photodiode 210. As shown in the example depicted in FIG. 2, first row select transistor 250A may, under control of a select signal RS_H, selectively provide the output signal from the source terminal of first amplifier transistor 240A to readout column line BL_H 270A. Similarly, as shown in the depicted example, second row select transistor 250B may, under control of a select signal RS_L, selectively provide the output signal from the source terminal of second amplifier transistor 240B to readout column line BL_L 270B. In another example, pixel cell 200 does not include any row select transistors 250A and 250B such that the output signals from each of the first and second amplifier transistors 240A and 240B are directly connected to their respective first and second readout column lines 270A and 270B.

Referring back to the illustrated example, photodiode 210 and floating diffusion FD 280 may be reset by temporarily asserting the reset signal RST on reset transistor 230 and the transfer signal TX on transfer transistor 220. In one example, photodiode 210 and floating diffusion FD 280 are reset prior to the acquisition of image data using pixel cell 200. At the end of the reset period, the reset signal RST and transfer signal TX may be de-asserted. An image accumulation window (e.g., an exposure period) may then be commenced by permitting incident light to photogenerate charge in photodiode 210. In one example, as photogenerated electrons accumulate on photodiode 210, the voltage on photodiode 210 decreases from the reset voltage. The voltage or charge on photodiode 210 may be representative of the intensity of the light incident on photodiode 210 during the exposure period.

After the exposure period, the transfer signal TX may then be asserted to allow an exchange of charge between photodiode 210 and floating diffusion FD 280, and hence to the respective gates of both first amplifier transistor 240A and second amplifier transistor 240B. The charge transfer between photodiode 210 and floating diffusion FD 280 causes the voltage of floating diffusion FD 280 to change by an amount representative of photogenerated electrons accumulated on photodiode 210 during the exposure period. As shown in the example depicted in FIG. 2, the voltage at floating diffusion FD 280 is coupled to the gate terminals of first and second amplifier transistors 240A and 240B, where the voltage at floating diffusion FD 280 is then amplified by first amplifier transistor 240A and second amplifier transistor 240B in accordance with the teachings of the present invention.

In one example, first row select transistor 250A selectively couples the output signal from first amplifier transistor 240A to first readout column line BL_H 270A in response to first row select signal RS_H and second row select transistor 250B selectively couples the output signal from second amplifier transistor 240B to second readout column line BL_L 270B in response to first row select signal RS_L. Thus, it is noted that example pixel 200 of FIG. 2 includes two readout column lines 270A and 270B for a single photodiode 210 in accordance with the teachings of the present invention.

In one example, first amplifier transistor 240A has a first threshold voltage and the second amplifier transistor 240B has a second threshold voltage. In the example, the first and second threshold voltages are different. Accordingly, in the example, the first and second amplifier transistors have different gain characteristics such that the first and second amplifier transistors 240A and 240B have different sensitivities to the intensity of the light incident on the photodiode 210 in accordance with the teachings of the present invention.

In one example, first amplifier transistor 240A has a lower threshold voltage than second amplifier transistor 240B. As will be discussed in greater detail below and in FIG. 3, under higher light intensity conditions, the voltage level at floating diffusion FD node 280 will be low due to the accumulation the electrons that are photogenerated in photodiode 210 as a result of the higher intensity incident light. Thus, in such higher light intensity conditions, the voltage level at floating diffusion FD node 280 will cause first amplifier transistor 240A to remain substantially ON as second amplifier transistor 240B turns substantially OFF. However, under lower light intensity conditions, the voltage level at floating diffusion FD node 280 will be higher, since under these conditions, fewer photogenerated electrons are transferred to floating diffusion FD node 280 than under higher light intensity conditions. In such lower light intensity conditions, the voltage level at floating diffusion FD node 280 will cause both first amplifier transistor 240A, with a lower threshold voltage, and second source follower transistor 240b, with a higher threshold voltage to remain substantially ON.

In one example, the different threshold voltages of first amplifier transistor 240A and second amplifier transistor 240B may be obtained by varying the doping concentrations and/or dopant type in the channel regions in the semiconductor material under their respective polysilicon gates accordingly. Thus, in this example, the doping concentration in the channel region of the first amplifier transistor 240A is different than the doping concentration in the channel region of the second amplifier transistor 240B. In one example, the threshold voltage of second amplifier transistor 240B may be increased by doping the channel region of this transistor with p-type dopants.

In another example, the different threshold voltages of first amplifier transistor 240A and second amplifier transistor 240B may be obtained by doping the polysilicon gates of the two amplifier transistors with dopants having opposite polarity. For instance, in the example illustrated in FIG. 2, the polysilicon gate of first amplifier transistor 240A may be doped with a p-type dopant, while the polysilicon gate of second amplifier transistor 240B may be doped with an n-type dopant. In one example, the polysilicon gate of first amplifier transistor 240A and second amplifier transistor 240B may each have a dopant concentration of $10^{18}$ to $10^{19}$ ions/cm$^3$.

Figure 3:
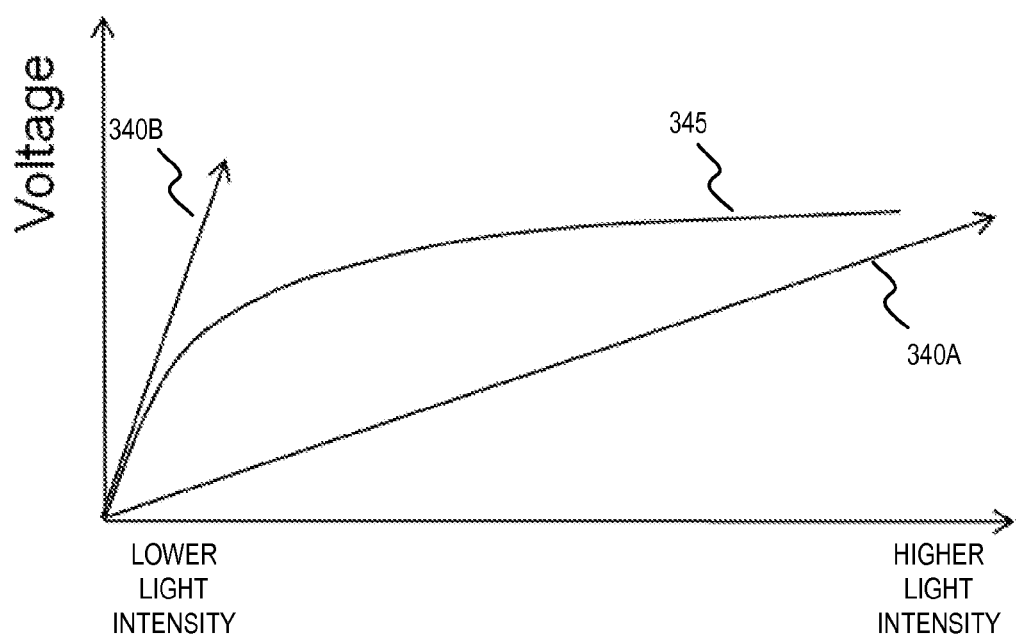
FIG. 3 is a diagram illustrating an example relationship between examples of output signals from the plurality of amplifier transistors and an example amplification signal over a range of lighting conditions in accordance with the teachings of the present invention.

FIG. 3 is a diagram 390 illustrating an example relationship between examples of output signals 340A and 340B from the plurality of amplifier transistors having different gain characteristics and an example amplification signal 345 utilizing the output signals 340A and 340B as component signals in accordance with the teachings of the present invention. In one example, it is appreciated that output signal 340A may be one example of an output signal from amplifier transistor 240A of FIG. 2 and output signal 340B may be one example of an output signal from amplifier transistor 240B of FIG. 2. Accordingly, in the depicted example, it is assumed that the amplifier transistor that generates output signal 340A has a different gain characteristic and a lower threshold voltage than the amplifier transistor that generates output signal 340B.

In the depicted example, the first and second output signals 340A and 340B are each component signals of amplification signal 345, which is representative of the light incident on the photodiode of the pixel cell. As shown in the example of FIG. 3, when generating amplification signal 345, for a higher intensity of light incident on the photodiode, the first output signal 340A has greater weight than the second output signal 340B in the amplification signal. Indeed, as discussed above, as the intensity of light increases, the number of electrons accumulated in the photodiode increases, which lowers the voltage on the gates of the first and second amplifier transistors accordingly. Since the first amplifier transistor has a lower threshold voltage than the second amplifier transistor in the example, the first output signal 340A tends to remain substantially ON for higher light intensities while the second output signal 340B tends to turn substantially OFF.

On the other hand, as shown in the depicted example, the second output signal 340B has a greater weight than the first output signal 340A in the amplification signal 345 for a lower intensity of light incident on the photodiode. As discussed above, as the intensity of light decreases, the number of photogenerated electrons that are accumulated in the photodiode remains smaller, which allows the voltage on the gates of the first and second amplifier transistors to remain higher. Since the voltage on the gates of the first and second amplifier transistors remains higher, both the first output signal 340A and second output signal 340B remain substantially ON for lower intensities of incident light.

Therefore, by having different threshold voltages and gain characteristics as described above, the first and second amplifier transistors that generate first and second output signals 340A and 340B have different sensitivities to different intensities of light that is incident upon the photodiode of the pixel cell. By weighting the component contributions of the first and second output signals 340A and 340B based on the intensity of the incident light as discussed, amplification signal 345 provides HDR information having increased sensitivity over a higher dynamic range of light intensities from the pixel cell utilizing first and second output signals 340A and 340B in accordance with the teaching of the present invention.

Figure 4:
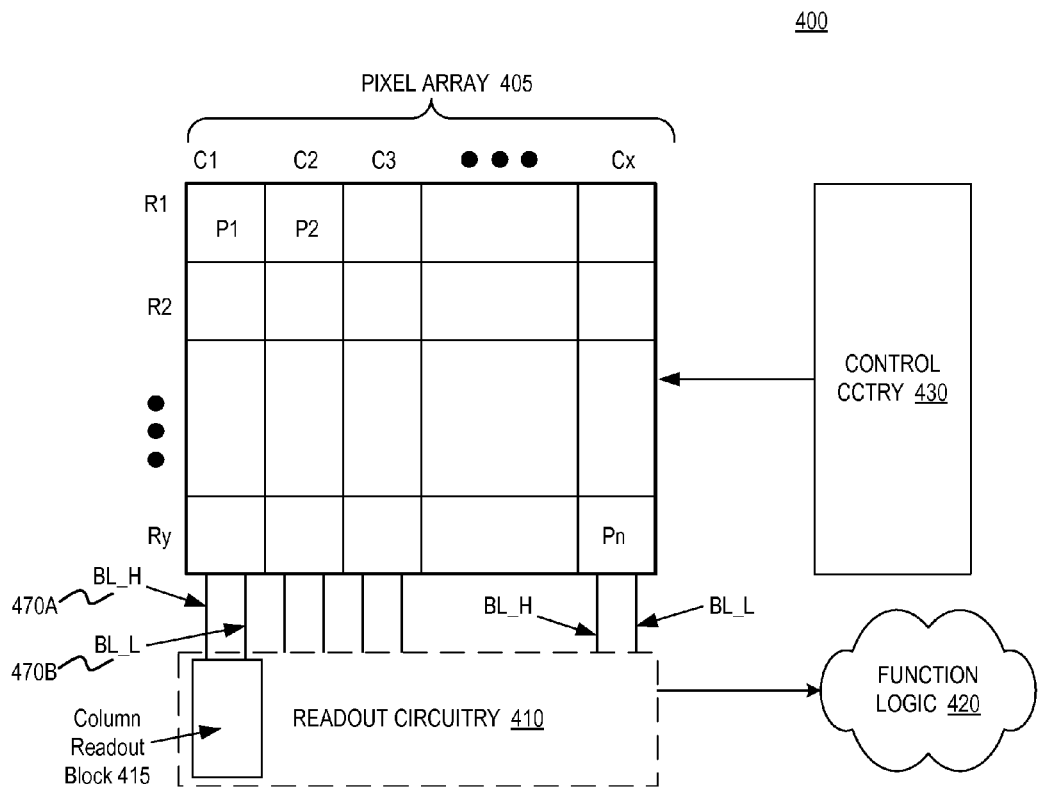
FIG. 4 is a block diagram illustrating an example imaging system in accordance with the teachings of the present invention.

FIG. 4 is a block diagram illustrating an example imaging system 400 utilizing a pixel array 405 including a plurality of pixel cells in accordance with an embodiment of the invention. In particular, as shown in the depicted example, imaging system 400 includes pixel array 405, readout circuitry 410, function logic 420 and control circuitry 430.

In the example, pixel array 405 is a two-dimensional (2D) array of imaging sensor cells or pixel cells (e.g., pixels P1, P2, ..., Pn). In one example, each pixel cell is a complementary metal-oxide-semiconductor (CMOS) imaging pixel including first and second amplifier transistors in accordance with the teachings of the present invention. Pixel array 405 may be implemented as a front-side illuminated image sensor or a backside illuminated image sensor. As illustrated, each pixel cell is arranged into a row (e.g., rows R1 to Ry) and a column (e.g., column C1 to Cx) to acquire image data of a person, place or object, which can then be used to render an image of the person, place or object.

In particular, after each pixel cell has acquired its image data or image charge, the image data is read out by readout circuitry 410 and transferred to function logic 420. Readout circuitry 410 comprises a plurality of column readout blocks 415 respectively. In the illustrated example, pixel cells arranged in the same column have their respective first and second output signals BL_H 470A and BL_L 470B coupled to be received by the same column readout block 415 in readout circuitry 410. In one example, each column readout block 415 includes circuitry to generate corresponding amplification signals in response to the component first and second output signals 470A and 470B based on the intensity of the incident light as discussed in detail above in accordance with the teachings of the present invention.

In one example, readout circuitry 410 may include amplification circuitry, analog-to-digital (ADC) conversion circuitry or otherwise. Function logic 420 may simply store the image data or even manipulate the image data by applying post image effects (e.g., crop, rotate, remove red eye, adjust brightness, adjust contrast or otherwise). In one example, readout circuitry 410 may read out a row of image data at a time along readout column lines (illustrated as first and second output signal bit lines BL_H 470A and BL_L 470B in FIG. 4) or may read out the image data using a variety of other techniques (not illustrated), such as serial readout, column readout along readout row lines, or a full parallel readout of all pixels simultaneously.

In one example control circuitry 430 is coupled to pixel array 405 and includes logic for controlling operational characteristics of pixel array 405. For example, reset RST, row select RS_H and RS_L signals and transfer signals TX may be generated by control circuitry 430. Control circuitry 430 may also generate a shutter signal for controlling image acquisition. In one example, the shutter signal is a global shutter signal for simultaneously enabling all pixels within pixel array 405 to simultaneously capture their respective image data during a single acquisition window. In an alternative example, the shutter signal is a rolling shutter signal whereby each row, column, or group of pixels is sequentially enabled during consecutive acquisition windows.

In one example, imaging system 400 is subsystem included in an electronic system. Examples of such electronic systems include a mobile phone, a computer, a digital camera, a medical device, and may further include an operating unit comprising a computing or processing unit related to the electronic system. For instance, an example electronic system may be a mobile phone, and the operating unit may be a telephone module included in the mobile phone that handles the telephone operation of the electronic system.

Figure 5A:
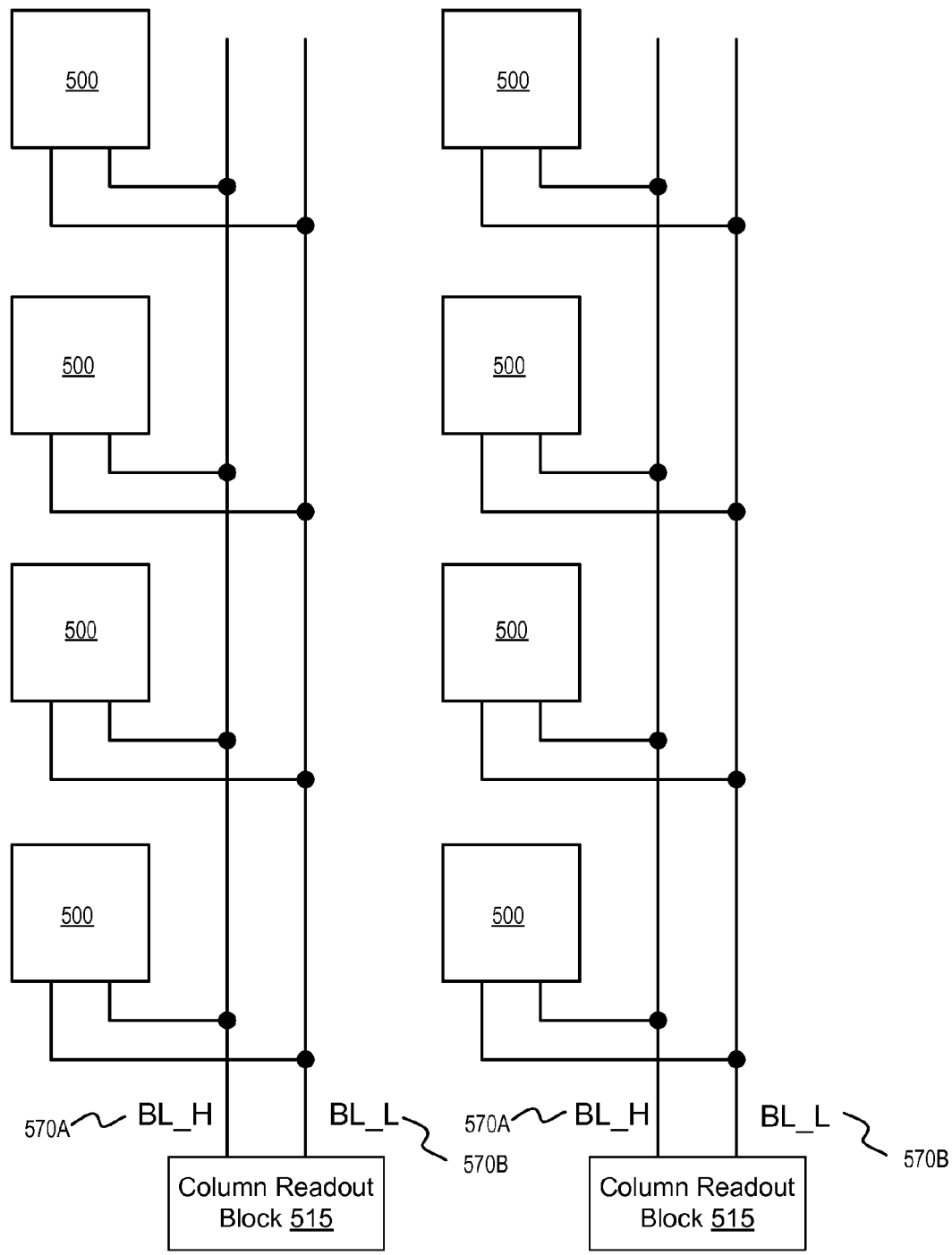
FIG. 5A is a diagram showing one example of a pixel cell arrangement in accordance with the teachings of the present invention.

FIG. 5A is a diagram showing one example of an arrangement of pixel cells 500 in accordance with the teachings of the present invention. As shown in the depicted example, pixel cells 500 arranged in the same column may be coupled to the same first and second readout column lines BL_H 570A and BL_L 570B. In this example, each pair of readout column lines BL_H 570A and BL_L 570B is coupled to one of a plurality of column readout blocks 515. A pixel array with X columns of pixel cells 500 may have readout circuitry which includes X column readout blocks.

Figure 5B:
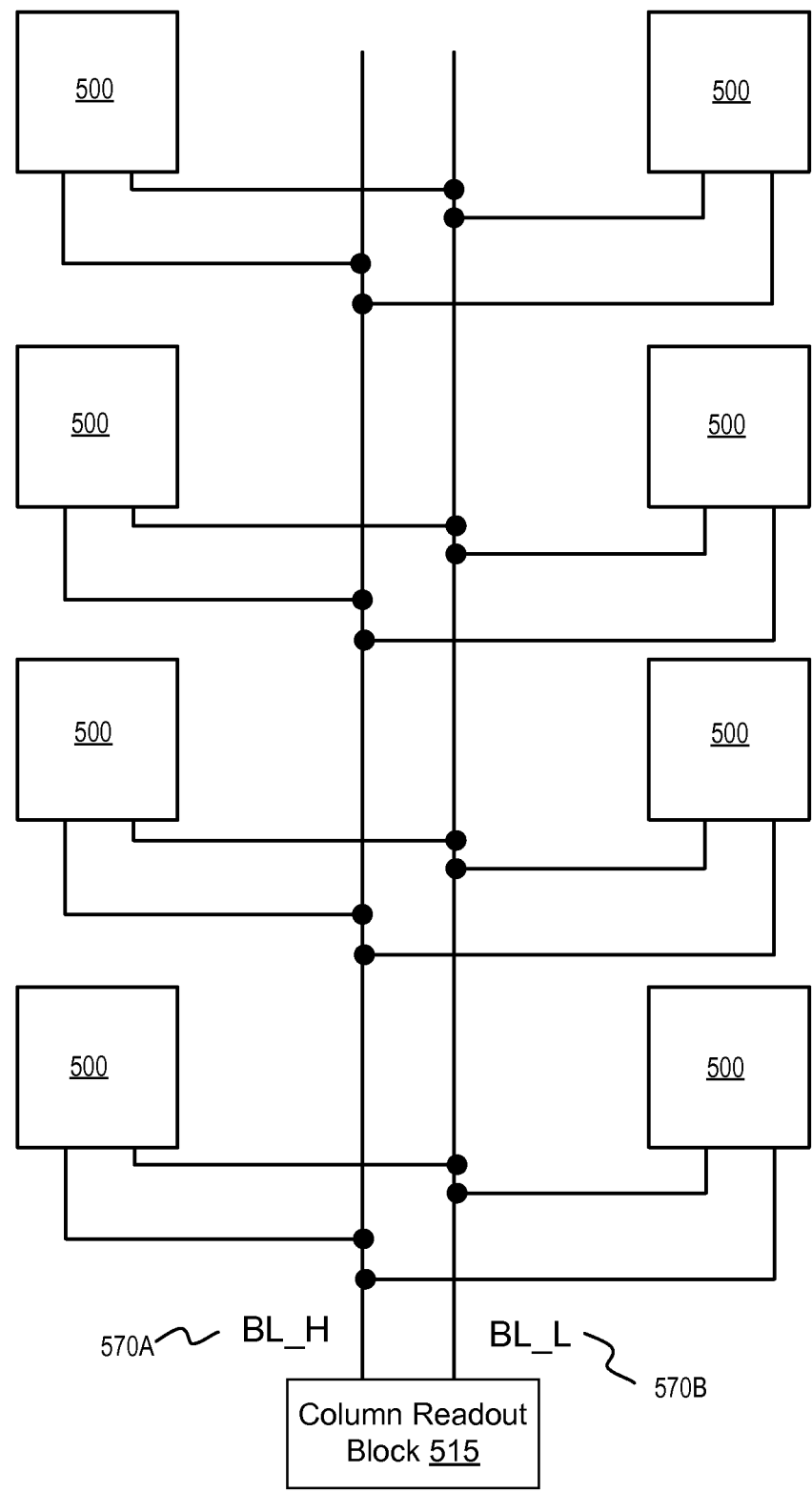
FIG. 5B is a diagram showing another example of a pixel cell arrangement in accordance with the teachings of the present invention.

FIG. 5B is a diagram showing another example of an arrangement of pixel cells 500 in accordance with the teachings of the present invention. As shown in the depicted example, pixel cells 500 arranged in two adjacent columns may time-share one column readout block 515. In this example, a pixel array with X columns of pixel cells 500 may have X/2 column readout blocks 515. In yet another example, N adjacent columns of pixel cells 500 may time-share each column readout block 515. In such an example, a pixel array with X columns may include X/N column readout blocks.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pixel cell for use in a high dynamic range image sensor, comprising:
    a photodiode disposed in semiconductor material to accumulate charge in response to light incident upon the photodiode;
    a transfer transistor disposed in the semiconductor material coupled between a floating diffusion and the photodiode;
    a first amplifier transistor disposed in the semiconductor material having a gate terminal coupled to the floating diffusion and a source terminal coupled to generate a first output signal of the pixel cell; and
    a second amplifier transistor disposed in the semiconductor material having a gate terminal coupled to the floating diffusion and a source terminal coupled to generate a second output signal of the pixel cell, wherein the first amplifier transistor has a first threshold voltage and a first gain, wherein the second amplifier transistor has a second threshold voltage and a second gain, wherein the first threshold voltage is different than the second threshold voltage and the first gain is different than the second gain such that the first and second amplifier transistors have different sensitivities to an intensity of the light incident on the photodiode.

2. The pixel cell of claim 1 wherein the both the first and second amplifier transistors are coupled to be substantially ON during a lower light intensity condition of the light incident on the photodiode, and wherein one of the first and second amplifier transistors is coupled to be substantially ON and an other one of the first and second amplifier transistors is coupled to be substantially OFF during a higher light intensity condition of the light incident on the photodiode.

3. The pixel cell of claim 1 wherein a channel region of the first amplifier transistor has a first doping concentration and wherein a channel region of the second amplifier transistor has a second doping concentration, wherein the first doping concentration is different than the second doping concentration.

4. The pixel cell of claim 1 wherein the gate terminal of the first amplifier transistor comprises semiconductor material having a first polarity and wherein the gate terminal of the second amplifier transistor comprises semiconductor material have a second polarity, wherein the first polarity is an opposite polarity of the second polarity.

5. The pixel cell of claim 4 wherein one of the first and second polarities is an n-type polarity, and an other one of the first and second polarities is a p-type polarity.

6. The pixel cell of claim 1 wherein the first and second output signals of the pixel cells are each component signals of an amplification signal responsive to the light incident on the photodiode, wherein the first output signal has greater weight than the second output signal in the amplification signal for a higher intensity of light incident on the photodiode and wherein the second output signal has a greater weight than the first output signal in the amplification signal for a lower intensity of light incident on the photodiode.

7. The pixel cell of claim 1 further comprising:
a first select transistor disposed in the semiconductor material coupled between the first amplifier transistor and a first bitline; and
a second select transistor disposed in the semiconductor material coupled between the second amplifier transistor and a second bitline.

8. The pixel cell of claim 1 further comprising a reset transistor disposed in the semiconductor material coupled to the floating diffusion.

9. A high dynamic range imaging system, comprising:
a pixel array having a plurality of pixel cells, wherein each one of the plurality of pixel cells includes:
a photodiode disposed in semiconductor material to accumulate charge in response to light incident upon the photodiode;
a transfer transistor disposed in the semiconductor material coupled between a floating diffusion and the photodiode;
a first amplifier transistor disposed in the semiconductor material having a gate terminal coupled to the floating diffusion and a source terminal coupled to generate a first output signal of the pixel cell; and
a second amplifier transistor disposed in the semiconductor material having a gate terminal coupled to the floating diffusion and a source terminal coupled to generate a second output signal of the pixel cell, wherein the first amplifier transistor has a first threshold voltage and a first gain, wherein the second amplifier transistor has a second threshold voltage and a second gain, wherein the first threshold voltage is different than the second threshold voltage and the first gain is different than the second gain such that the first and second amplifier transistors have different sensitivities to an intensity of the light incident on the photodiode;
control circuitry coupled to the pixel array to control operation of the pixel array; and
readout circuitry coupled to the pixel array to readout the first and second output signals from each one of the plurality of pixel cells.

10. The imaging system of claim 9 wherein the plurality of pixel cells is arranged into a plurality of rows and a plurality of columns, wherein the readout circuitry includes a plurality of readout blocks, wherein each one of the plurality of readout blocks is coupled to receive the first and second output signals from one or more of the plurality of columns of the pixel cells.

11. The imaging system of claim 9 further comprising function logic coupled to the readout circuitry to store the image data readout from the plurality of pixel cells.

12. The imaging system of claim 9 wherein the both the first and second amplifier transistors are coupled to be substantially ON during a lower light intensity condition of the light incident on the photodiode, and wherein one of the first and second amplifier transistors is coupled to be substantially ON and an other one of the first and second amplifier transistors is coupled to be substantially OFF during a higher light intensity condition of the light incident on the photodiode.

13. The imaging system of claim 9 wherein a channel region of the first amplifier transistor has a first doping concentration and wherein a channel region of the second amplifier transistor has a second doping concentration, wherein the first doping concentration is different than the second doping concentration.

14. The imaging system of claim 9 wherein the gate terminal of the first amplifier transistor comprises semiconductor material having a first polarity and wherein the gate terminal of the second amplifier transistor comprises semiconductor material have a second polarity, wherein the first polarity is an opposite polarity of the second polarity.

15. The imaging system of claim 14 wherein one of the first and second polarities is an n-type polarity, and an other one of the first and second polarities is a p-type polarity.

16. The imaging system of claim 9 wherein the first and second output signals of the pixel cells are each component signals of an amplification signal responsive to the light incident on the photodiode, wherein the first output signal has greater weight than the second output signal in the amplification signal for a higher intensity of light incident on the photodiode and wherein the second output signal has a greater weight than the first output signal in the amplification signal for a lower intensity of light incident on the photodiode.

17. The imaging system of claim 9 wherein each one of the plurality of pixel cells further comprises:
a first select transistor disposed in the semiconductor material coupled between the first amplifier transistor and a first bitline; and
a second select transistor disposed in the semiconductor material coupled between the second amplifier transistor and a second bitline.

18. The imaging system of claim 9 wherein each one of the plurality of pixel cells further comprises a reset transistor disposed in the semiconductor material coupled to the floating diffusion.

19. A method for generating image data from a pixel cell, comprising:
photogenerating charge in a photodiode in response to light incident upon the photodiode;
transferring the charge between the photodiode and a floating diffusion through a transfer transistor;
generating a first output signal in response to the charge at the floating diffusion with a first amplifier transistor having a gate terminal coupled to the floating diffusion, wherein the first output signal is generated at a source terminal of the first amplifier transistor;
generating a second output signal in response to the charge at the floating diffusion with a second amplifier transistor having a gate terminal coupled to the floating diffusion, wherein the second output signal is generated at a source terminal of the second amplifier transistor, wherein the first and second output signals of the pixel cells are each component signals of an amplification signal responsive to the light incident on the photodiode;

weighting the first output signal greater than the second output signal in the amplification signal for a higher intensity of light incident on the photodiode; and weighting the second output signal greater than the first output signal in the amplification signal for a lower intensity of light incident on the photodiode.

20. The method of claim 19 wherein generating the first output signal comprises amplifying a voltage at the floating diffusion with the first amplifier transistor having a first gain, wherein generating the second output signal comprises amplifying the voltage at the floating diffusion with the second amplifier transistor having a second gain, wherein the first gain is different than the second gain.

21. The method of claim 19 further comprising selecting the first and second output signals with first and second select transistors coupled to the first and second amplifier transistors, respectively.

22. The method of claim 19 further comprising resetting the charge at the floating diffusion and the photodiode with a reset transistor coupled to the floating diffusion prior to photogenerating the charge in the photodiode in response to the light incident upon the photodiode.

* * * * *